UNITED STATES PATENT OFFICE.

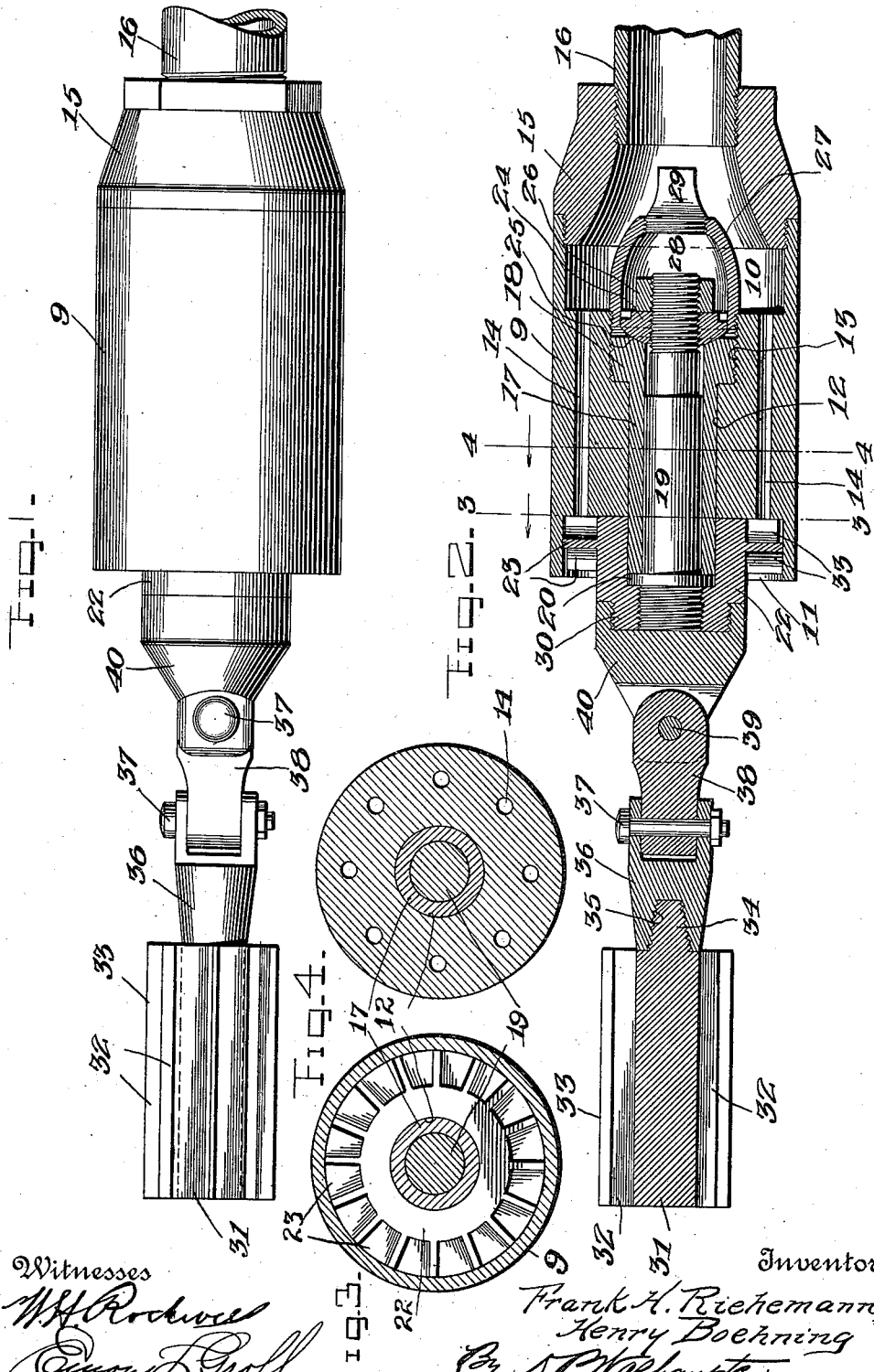

FRANK H. RIEHEMANN AND HENRY BOEHNING, OF ST. LOUIS, MISSOURI.

MOTOR DEVICE FOR BOILER-TUBE CLEANERS.

1,028,136. Specification of Letters Patent. Patented June 4, 1912.

Application filed November 3, 1909. Serial No. 526,151.

*To all whom it may concern:*

Be it known that we, FRANK H. RIEHEMANN and HENRY BOEHNING, citizens of the United States, residing at St. Louis, in the State of Missouri, have invented certain new and useful Improvements in Motor Devices for Boiler-Tube Cleaners, of which the following is a specification.

The present invention relates to mechanism for cleaning the scale and accumulations from the interiors of boiler tubes, and the primary object is to provide an exceedingly simple, compact, and yet effective structure, which can be inserted directly into the tube, and will loosen and remove such accumulation.

A further and important object is to provide a structure and cleaning devices that are interchangeable, so that said different devices may be employed, according to the different conditions of the tubes.

In the accompanying drawings:—Figure 1 is a side elevation of the preferred form of construction. Fig. 2 is a longitudinal sectional view therethrough. Figs. 3 and 4 are respectively sectional views on the lines 3—3 and 4—4 of Fig. 2.

Similar reference numerals designate corresponding parts in all the figures of the drawings.

In the embodiment disclosed, a head 9 is employed that is insertible into the tube to be cleaned, said head having a chamber 10 in its rear end and having its front end recessed, as shown at 11. It is furthermore provided with a central bore 12, the rear portion of which is enlarged and internally threaded, as shown at 13. Surrounding this bore is a series of longitudinal motive fluid delivery ports 14 communicating with the chamber 10 and the recess 11. A tapered collar 15 is threaded into the rear end of the head, and constitutes a coupling for a supporting device that is in the form of a pipe 16, said pipe constituting means for conveying motive fluid from any suitable source to the chamber 10.

Located in the bore 12 is a bearing sleeve 17 having an enlarged rear end 18 threaded into the enlarged portion 13 of said bore, the front end of the sleeve 17 projecting into the recess 11. Journaled in this sleeve, and consequently having an extended bearing, is a shaft 19 having a flange 20 located at the front end of the sleeve, and having a threaded terminal portion 21 projecting beyond the flange. A rotary motor wheel has a hub 22 threaded on to the terminal portion 21, said hub having an enlarged portion extending rearwardly over the flange 20 and projecting portion of the sleeve 17. This enlarged portion is provided with an annular series of inclined blades 23 that operate across the outer ends of the delivery ports 14. The shaft 19 is held against longitudinal displacement by a nut 24 threaded on its rear end, which nut has a tapered portion 25 bearing against the rear end of the sleeve 17, forming a thrust bearing. A jam or lock nut 26, located on the rear end of the shaft, prevents displacement of the bearing nut 24. The rear of the shaft with its bearing is covered by a cap nut 27 threaded into the enlarged portion 13 of the bore 12 and chambered, as illustrated at 28, this chamber constituting a lubricant reservoir. Access to the chamber 28 is obtained by means of a removable plug 29 threaded into the cap. It will also be noted that this cap 27 constitutes means for spreading the motive fluid toward the ports 14.

The hub 22 has its projecting portion reduced and threaded to form a spindle 30, by means of which the cleaning mechanism can be attached to the motor. This cleaning means may be constructed in different ways, according to the work to be done. Thus in the preferred embodiment disclosed in Figs. 1 and 2, a tool 31 is provided having a series of longitudinally disposed blades 32, the outer edges of which are sharpened, as shown at 33. This tool has a tapered spindle 34 that is threaded into the socket 35 of a coupling member 36. The coupling member has a pivotal connection 37 with another member 38, which in turn has a pivotal connection 39 with a cap 40, the cap being arranged to be detachably threaded upon the spindle 30. It will be observed that the pivotal conections 37 and 39 are disposed at right angles to each other, so that a universal joint connection is thus produced between the tool 33 and the cap 40.

In using the device, water or other motive fluid is admitted to the chamber 10, through the pipe 16, and the entire device is introduced into the tube to be cleaned. If the tube has a thick accumulation, the tool 33 is employed, inasmuch as it will cut its way through such accumulation. The motive fluid, passing from the chamber 10 through the ports 14, will strike the blades 23 of the motor wheel, causing the same to revolve with great speed, thus rotating the tool 31. It will be observed that this structure is exceedingly compact, and while all the parts are thoroughly protected, they are easily accessible. Moreover the motor has an extended bearing, which insures its easy operation, and obviates any danger of excessive wear.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. A motor device for boiler tube cleaners comprising a head having a rear chamber and a front recess, said head also having a central bore and a plurality of ports surrounding the bore and communicating with the chamber and the recess, said bore having an enlarged and internally threaded rear portion, means for delivering motive fluid to the chamber, a sleeve located within the bore and provided with an enlarged rear end which has threaded engagement with the enlarged portion of the said bore, a shaft journaled in the sleeve and having its rear end threaded and projecting beyond the same, a rotary motor wheel carried by the front end of the shaft and arranged within the recess, a bearing nut arranged on the rear end of the shaft and engaging the sleeve, and a flue cleaner coupling connected to the wheel.

2. A motor device for boiler tube cleaners comprising a head having a central bore formed with an enlarged and internally threaded rear portion, a sleeve fitted within the bore and having a threaded member engaging said threaded rear portion thereof, a shaft journaled in the sleeve and carrying at its front end a motor wheel and at its rear end a bearing element engaging the sleeve, flue cleaning coupling means connected with the motor wheel, means for supplying the motive fluid through said head to the wheel, and a combined lubricant-holding and covering cap provided with a detachable plug and removably threaded into said threaded rear portion of the bore, said cap being arranged over the rear end of the shaft and the bearing element carried thereby.

3. A motor device for boiler tube cleaners comprising a head having a central bore formed with an enlarged and internally threaded rear portion, a sleeve fitted within the bore and held in position by means engaging the said threaded rear portion thereof, a shaft journaled in the sleeve and carrying in front thereof a motor wheel and at its rear end a bearing portion engaging the sleeve, means for connecting flue cleaning means with the motor wheel, and means for supplying the motive fluid through said head to the wheel.

In testimony whereof we hereunto affix our signatures in the presence of two witnesses.

FRANK H. RIEHEMANN.
HENRY BOEHNING.

Witnesses:
ELLA SCHERER,
HENRIETTE SCHERER.

Copies of this patent may be obtained for five cents each, by addressing the "Commissioner of Patents, Washington, D. C."